(No Model.) 2 Sheets—Sheet 2.
T. J. REID.
PROCESS OF TIRING WHEELS.
No. 393,030. Patented Nov. 20, 1888.
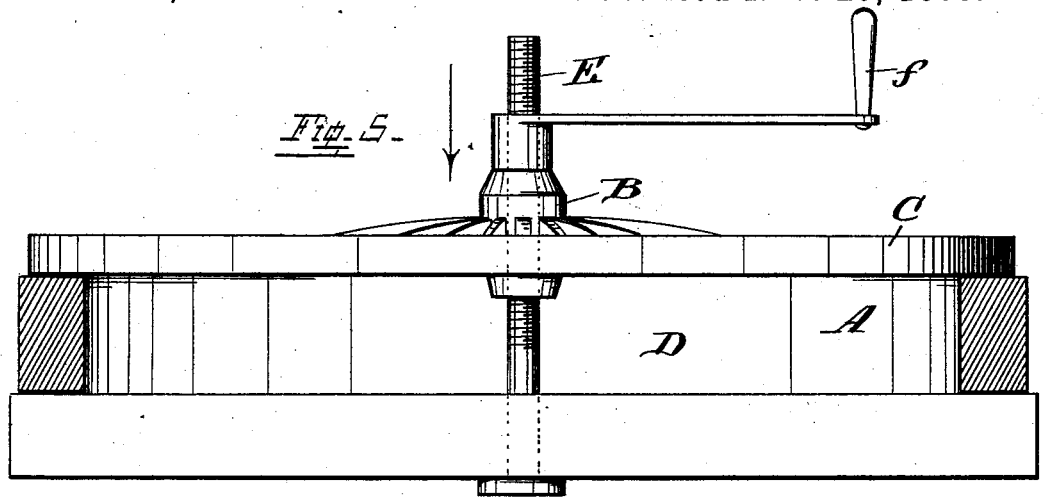
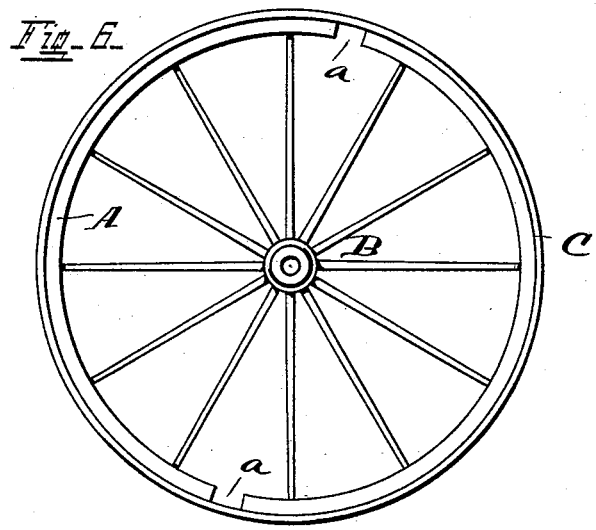
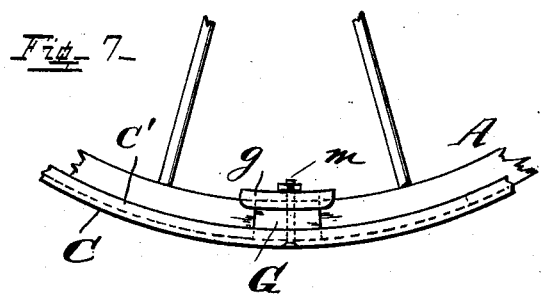
Attest.
Carl Spengel
George Heidman
Inventor,
Thomas J. Reid,
By Arthur Stein Atty.

UNITED STATES PATENT OFFICE.

THOMAS J. REID, OF GANANOQUE, ONTARIO, CANADA.

PROCESS OF TIRING WHEELS.

SPECIFICATION forming part of Letters Patent No. 393,030, dated November 20, 1888.

Application filed May 16, 1888. Serial No. 274,046. (No model.)

*To all whom it may concern:*

Be it known that I, THOMAS J. REID, a citizen of the United States, at present residing at Gananoque, in the county of Leeds and Province of Ontario, Canada, have invented a new and useful Improvement in the Art or Process of Tiring Wheels, of which the following is a full, clear, and exact description.

My invention relates to an improvement in the art or process of putting the tires on wheels, and is more especially applicable in tiring light buggy or carriage wheels.

It has for its object the application of the tire in such a way that the tension of the tire shall be as nearly equal on all points on the rim of the wheel as possible, and to prevent the breaking or weakening of the rim of the wheel at the points where the spokes enter it, and at the same time to adjust the dish of the wheel at any desired degree.

It consists, primarily, in cutting out a short section or sections of the rim of the wheel, then dishing the wheel sufficiently, thus reducing the diameter of the wheel, so that the tire can readily be placed around it, then reducing the dish of the wheels and expanding the rim until the tire is sufficiently tight and the dish is at a proper degree, and filling the open spaces in the rim with blocks which shall hold the rim in the desired position to secure the proper amount of tension and dish.

In applying the tire by my process it is necessary to change the dish of the wheel, so that by adjusting the size of the tire that is to be applied to the wheel I can thereby adjust the degree or extent of the dish, so that the tire will become sufficiently tightened when the proper degree of dish has been reached, thus enabling me by one and the same operation to secure the proper tension of the tire and the desired dish of the spokes. I can also, when the tire becomes loose by the shrinking of the wood or from some other cause, tighten the tire without removing it by reducing the dish of the wheel, thus expanding the circumference of the rim and securing it in place by means of larger or additional blocks.

The first object of the invention is the even and proper tension of the tire on all points of the rim of the wheel, and, secondly, by adjusting the size of the tire to fix the dish of the wheel at any desired degree.

In the accompanying drawings, forming part of this specification, Figure 1 is a side elevation of an ordinary buggy-wheel without the tire. Fig. 2 is a side elevation of the wheel with short sections of the rim cut away. Fig. 3 is a side elevation of a wheel resting on a trestle and contracted by being dished to receive the tire. Fig. 4 shows the wheel contracted and the tire placed around it. Fig. 5 is a side elevation of the wheel inverted on the trestle and the screw applied to reduce the dish and further extend or enlarge the diameter in the direction of its original position to fill the tire. Fig. 6 shows the wheel fully extended ready to receive the cushion. Fig. 7 is a section of the rim and tire with the cushion applied.

In the accompanying drawings like letters of reference indicate identical parts.

B is the hub of a wheel; A, the rim attached to the spokes in the usual way. These wheels may be made with a slight dish, or with the spokes and rim all in the same plane. I first cut away a part of the rim, as shown at *a a*, Fig. 2. I then place the wheel on a trestle, D, Fig. 3, which is provided with a central screw-bolt, E, which is stationary and which passes through the central opening in the hub. By turning the lever or screw *f* the hub of the wheel is forced down, as indicated by the arrow, the elasticity of the spokes allowing them to spring or bend between the hub and rim without being moved or disturbed in the hub. The result of this is that the rim of the wheel is contracted and the openings at *a a* are partially or entirely closed. In the drawings I have shown the tire C with flanges C′, intended to embrace the sides of the rim and prevent the rim from splitting. When this form of tire is used, it is of course necessary to contract the rim of the wheel to a greater degree to permit the flanges to pass over it than when an ordinary flat tire is used; but I do not make any special claim for this form of tire. When the rim of the wheel has been sufficiently contracted and the tire is placed around it, I reverse the motion of the crank *f* and permit the wheel to expand as much as the natural spring will cause it to against the pressure of the tire until it approaches its original position or shape. If the tension and dish are then at the point desired, the openings *a a* may be filled;

if not, as is usually the case, the wheel is turned over on the trestle, as shown in Fig. 5, and the screw or nut $f$ is again applied, forcing the hub downwardly, forcing the rim outward against the inner surface of the tire, increasing the tension, which is thus very evenly distributed throughout the entire rim, and at the same time reducing the dish of the wheel. By this means there is no lateral compression of the rim, it is not broken or buckled at its weaker points or where the spokes enter it, no buckling is caused, and its strength and elasticity are fully preserved. As soon as these conditions—that is, the tension and the dish—are satisfactory, I then take a block of wood or metal or rubber, or any desired material, of a size and shape to fill the openings $a\ a$, as shown at G, Fig. 7. Through this block or cushion is passed a bolt, $m$. The outer end of it is upset on the outside of the tire to form a head, which may be sunk in the tire, as shown. The inner end of the bolt is provided with a screw-thread and nut. An iron clamp or clip, $g$, embraces the inside of the block G. By screwing up the nut on the bolt the block or cushion G is forced into the opening and rigidly retained there. By adjusting the size of this cushion G the tension of the tire and the degree of the dish may be adjusted as desired.

My process of applying the tire to the wheel or putting the wheel in a tire secures a greater amount of elasticity, the more even and perfect distribution of the tension of the tire, and the perfect adjustment of the wheel without injury to the rim by lateral upsetting at weak points where the spokes enter it, as is often the case in contracting the tire on the wheel in the old way. When the tire gets loose, I need not take it off and shorten it and then replace it in the old way, which injures the wheel, weakening the rim, and increasing the dish; but I can simply take out the cushion G and replace it by a larger one, expanding the rim to fill the tire and retain the dish just as it was in the new wheel; or at any time the dish of the wheel can be increased or diminished at will without removing the tire. It is not desired to use this process on large or heavy wagon-wheels constructed with fellies instead of rims, but lighter carriage-wheels, where the elasticity is much greater, and will allow of the spring of spokes without disturbing them in the hub.

I am aware that it is not new to cut away portions of the rim of a wheel and to draw the ends of the rim together to contract the diameter, and then, after the tire has been placed on the wheel, to fill the spaces with a block, and I do not make any broad claim therefor.

Having thus fully described my invention, what I do claim, and desire to secure by Letters Patent, is—

1. The above-described process of applying the tire to a wheel, consisting in cutting away a portion of the rim, forcing the hub out of line with the rim and contracting the diameter of the wheel, placing the tire on the wheel, and then forcing the hub in the opposite direction to the desired point and filling the spaces or opening in the rim with a block, substantially as and for the purpose described.

2. The above described process of applying the tire to a wheel to adjust the dish of the wheel, consisting in cutting away a portion of the rim, springing or bending the spokes laterally to contract the rim, fitting on the tire, again expanding the rim, and inserting a block in the opening in the rim to hold the wheel in the desired position, substantially as and for the purpose described.

THOMAS J. REID.

Witnesses:
W. B. CARROLL,
JOHN F. McDONALD.